April 16, 1963  F. A. WETTSTEIN  3,085,796
HYDROPNEUMATIC SUSPENSION AND DAMPING
DEVICE FOR VEHICLES
Filed May 9, 1960
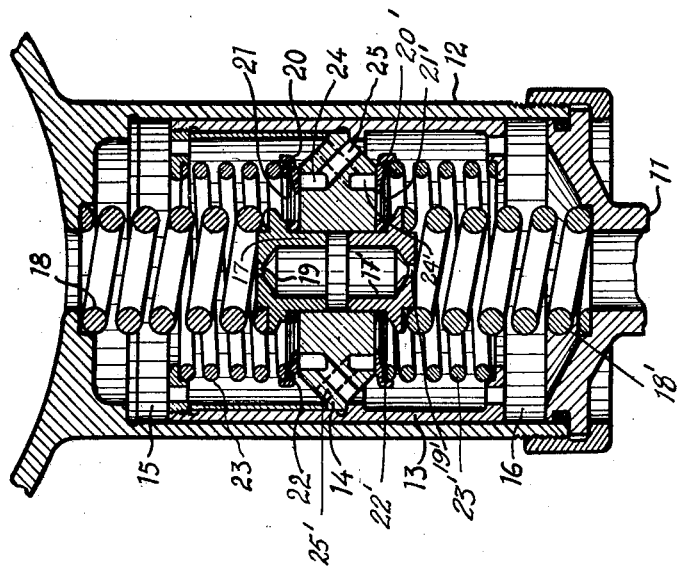
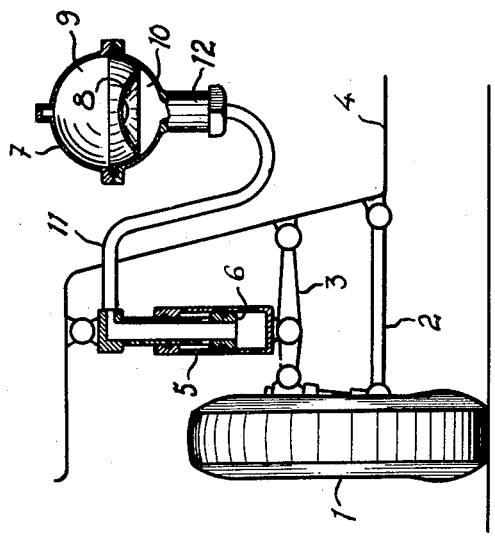

United States Patent Office 3,085,796
Patented Apr. 16, 1963

3,085,796
HYDROPNEUMATIC SUSPENSION AND DAMPING DEVICE FOR VEHICLES
Fritz A. Wettstein, Goteborg, Sweden, assignor to Aktiebolaget Volvo, Goteborg, Sweden, a corporation of Sweden
Filed May 9, 1960, Ser. No. 27,874
Claims priority, application Sweden May 13, 1959
2 Claims. (Cl. 267—64)

This invention relates to a hydropneumatic suspension and damping device for vehicles.

Devices of this type are known which comprise a hydraulic servo-element provided between the sprung part and the un-sprung part of the vehicle, said element communicating through a conduit with a liquid space in a pressure container which is filled partly with a liquid and partly with a compressed gas. Such a device can serve as a suspension as well as damping device for a vehicle. However, in devices of this kind, the damping forces may cause uncomfortable shocks in the sprung part of the vehicle, generally known as harshness of ride. It is the primary purpose of the damping device to bring about a rapid and effective damping of the free vibrations which may occur in the sprung and un-spring parts of the vehicle. For this purpose it is desirable that the damping forces increase proportional with the speed of the spring action. If the un-sprung part, i.e., the wheel of the vehicle is subjected to a sudden and rapid forced deflecting movement, there may arise sudden and great damping forces which result in the abovementioned shocks in the sprung part of the vehicle.

The object of the invention is to minimize such shocks, and the invention is characterized by the fact that a restriction and a resilient damping device are arranged in parallel relative to the flow in said conduit. The result of this arrangement is that upon a sudden impact on the un-sprung part of the vehicle the shock acting on the sprung part of the vehicle will be reduced. Calculations as well as experiments have proved that the device according to the invention renders possible a considerable reduction of the shocks without noticeable weakening of the damping effect of the vehicle, provided that the deflection of the sprung part of the vehicle, due to the said resilient damping device, does not considerably exceed the deflection of the pneumatic tire for the same load. Within this limitation, particularly those uncomfortable shakes are minimized which from minor road irregularities can be transmitted to the sprung part of the vehicle through the pneumatic tire and the damping device.

An embodiment of the invention is described hereinbelow with reference to the annexed drawing in which FIG. 1 is a diagrammatic illustration of a hydropneumatic suspension and damping device according to the invention, and FIG. 2 is a sectional view of the damping device on an enlarged scale.

The vehicle wheel 1 which hereinbelow is termed the un-sprung part of the vehicle is by means of suspension arms 2 and 3 movably connected to the chassis or sprung part 4 of the vehicle. Movably interconnected between the upper suspension arm 3 and the sprung part 4 of the vehicle is a hydraulic servo element which consists of a differential cylinder 5 and a differential piston 6 movable in the cylinder. A pressure container 7 is mounted in the part 4 and by means of an elastic diaphragm 8 divided into a chamber 9 filled with a compressed gas and another chamber 10 which is filled with a hydraulic fluid. The servo element 5, 6 is filled with the same liquid and communicates with the liquid space 10 of the pressure container 7 through a flexible conduit 11. The conduit 11 communicates also with a cylinder 12 containing a damping device.

FIG. 2 illustrates a section through the damping cylinder 12 in which a piston 13 is contained. Rigidly secured within the piston 13 is a valve plate 14. The piston 13 and the valve plate 14 divide the cylinder 12 into a chamber 15 which communicates with the liquid chamber 10 in the pressure container 7, and a chamber 16 which through the conduit 11 communicates with the servo element 5, 6. Helical springs 18 are inserted between the end walls of the cylinder 12 and spring seats 17 in the valve plate 14.

The damping device consists partly of the restricted openings 19 in the spring seats 17 and partly of the valve rings 20 which are guided by resilient diaphragms 22 having openings 21 and abutting against helical springs 23. The valve plate 14 has annular ducts 24 which through bores 25 communicate with the respective cylinder chambers on either side of the valve plate 14.

The resilient damping device 12 is a symmetrically balanced unit, with its valve plate 14 disposed intermediate identical means above and below. Thus elements 17', 18', 19', 20', 21', 22', 23', 24' and 25' respectively are identical with corresponding elements 17 through 25. Assuming an entirely smooth stretch of highway, when wheel 1 neither rides bumps or drops in depressions, the balanced elements (without and with primes, i.e., 17 and 17') will remain as shown in FIG. 2.

The resilient damping device 12 contains orifice members 17 and 17' and other valve units 20—22 and 20'—22', with these members 17 or 17' effectively being in parallel, respectively, with valve units 20—22 or 20'—22', with respect to servo unit 5, 6 and its flow of liquid through conduit 11 into the liquid portion 10 of pressure container 7.

On relatively smooth highway (relatively little movement of piston 6 in cylinder 5 of the servo unit), an orifice 19 or 19' will permit normal adjustment in pressure container 7, and there will be negligible pressure drop in the space above or below 14, FIG. 2. As the ride becomes less smooth, causing greater or more rapid movement of 6 in 5, a valve unit 20—22 or 20'—22' will lift from its seat and maintain smooth flow of liquid through 11 into the space above or below 14, thus maintaining the smoothness of ride, and lack of disturbing vibration of part 4 of the vehicle. Thus the resilient damping device 12 will counteract any rough damping resulting from the operation of servo unit 5, 6.

The mode of operation of the device is as follows. If the wheel 1 is forced upwards, for instance by a bump on the road, the cylinder space in the servo element 5, 6 will be reduced and hydraulic fluid will be forced through the conduit 11 and the cylinder 12 into the liquid chamber 10 of the pressure container 7. As a result, the gas in the chamber 9 will be compressed so as to exert the desired spring action. The liquid flowing through the device in the cylinder 12 will be subjected to a pressure drop the magnitude of which is determined by the size of the openings 19, the flow through the ducts 25 and the valve ring 20 which is loaded by the spring 23 and controls the flow through the ducts 25. As the amount of liquid flowing through the device increases, the valve ring 20 will begin to open at its inner edge as a result of a torsional movement of the ring itself, since the spring 23 abuts against the valve ring 20 at a radius different from the mean radius of the annular duct 24. In combination with the flow through the openings 19 this results in a pressure drop which will be practically proportional to the total volume of liquid flowing through the damping device. If this flow is increased above a certain value the valve ring 20 will open entirely by compressing the spring 23, in which case the device will act as an excess pressure valve.

The springs 18 maintain the piston 13 in the intermediate position as long as there is no resilient deflecting movement between the sprung part 4 and the unsprung part 1 of the vehicle. However, in case of the above described deflecting movement, the piston 13 will be forced upwards as a result of the pressure differential in the chambers 16 and 15 caused by the damping device. The faster the deflecting movement, the greater becomes the pressure drop in the damping device and the more is the piston 13 forced upwards against the action of the spring 18. The pressure limitation obtained by the valve ring 20 during compression of the spring 23 also acts to limit the stroke of the piston 13.

It will be obvious that upon a resilient deflecting movement in the opposite direction the upper valve ring 20 will remain closed, whereas the corresponding valve ring on the lower side of the valve plate will open and determine the rate of damping.

The piston 13, valve plate 14 and springs 18 form a resilient device which together with the openings 19 and the valve rings 20 is arranged in parallel relative to the liquid flow between the servo element 5, 6 and the pressure container 7. Upon rapid relative movements between the sprung part 4 and the un-sprung part 1 of the vehicle the piston prevents the pressure variations arising in the damping device from becoming too great and thus reduces the shocks on the sprung part of the vehicle resulting from the action of the resilient damping device.

This may be best understood if a sudden and rapid springing movement of the vehicle wheel 1 is assumed. Without the action of the resilient device such movement would cause a sudden pressure drop in the damping device, which pressure drop would exert a sudden shock on the sprung part 4 of the vehicle through action of the servo element 5, 6. If, however, the resilient piston 13 is arranged according to the invention, the piston will yield during the first moment so that the damping action will be smoothened. Consequently, the device according to the invention reduces particularly the vibrations of the sprung part of the vehicle which are caused by minor road irregularities and which are termed harshness of ride, but it also reduces the harshness of vibrations on rough roads.

What I claim is:

1. A hydropneumatic suspension and damping device for a vehicle having a sprung part and an unsprung part, comprising a hydraulic servo element provided between the sprung part and the unsprung part of the vehicle, said element communicating through a conduit with a liquid space in a pressure container which is filled partly with a liquid and partly with a compressed gas, said conduit comprising a restriction and a resilient displacement device arranged in parallel, with regard to the flow between the servo element and the pressure container, wherein the resilient displacement device comprises a spring-loaded piston having ducts therein and movable in a cylinder, said piston providing spaces beyond its end portions, the restriction being formed as a flow orifice in the piston, resilient valve members being provided to control flow through the ducts, which ducts interconnect the said spaces, the valve members being spring-loaded and provided with annular valve seats concentrically arranged within the spring-loaded piston and guided by a resilient diaphragm located between the valve member loading spring and the valve seat.

2. A suspension and the damping device according to claim 1 in which the springs acting on the annular valve seats act at a diameter other than the mean diameter of the valve seats.

References Cited in the file of this patent

UNITED STATES PATENTS

| | | |
|---|---|---|
| 2,570,362 | Mercier | Oct. 9, 1951 |
| 2,756,989 | Peras | July 31, 1956 |
| 2,812,954 | Lyon | Nov. 12, 1957 |
| 2,885,202 | Trumper | May 5, 1959 |
| 2,923,557 | Schilling | Feb. 2, 1960 |
| 2,934,332 | Mercier | Apr. 26, 1960 |

FOREIGN PATENTS

| | | |
|---|---|---|
| 214,072 | Switzerland | June 16, 1941 |